United States Patent Office 3,594,218
Patented July 20, 1971

3,594,218
WATER AND OIL REPELLENT ARTICLES
Elemer Domba, Olympia Fields, Ill., assignor to Nalco Chemical Company, Chicago, Ill.
No Drawing. Continuation-in-part of application Ser. No. 732,505, May 28, 1968, which is a continuation-in-part of application Ser. No. 494,872, May 28, 1965, both now abandoned. This application Aug. 6, 1969, Ser. No. 848,121
Int. Cl. D06m 15/16
U.S. Cl. 117—139.5         2 Claims

ABSTRACT OF THE DISCLOSURE

New and useful ethylenically unsaturated fluorinated polymers can be used to make articles and fabrics water and oil repellent.

---

This application is a continuation-in-part of my earlier filed co-pending application, Ser. No. 732,505 filed May 28, 1968, now abandoned, which was a continuation-in-part of my earlier filed co-pending application, Ser. No. 494,872 filed May 28, 1965, now abandoned.

OBJECTS OF THE INVENTION

It is an object of the invention to provide coated fabrics and other articles which have the property of being substantially permanently resistant to absorption of oil and water regardless of subsequent treatment of the article.

Other objects will be apparent from reading the specifications.

INVENTION

In accordance with the invention, I have discovered an extremely useful and novel class of unsaturated esters which may be easily homopolymerised and copolymerized with a variety of differing monomers to produce coating reagents used to treat fabrics and related articles. In its broadest aspects, the invention includes discovery of the following class of polymerizable unsaturated esters. These esters have the following general structural formula:

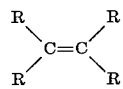

where R is a radical selected from the group consisting of hydrogen, lower alkyl, carboxyl and a fluorinated carboxylate ester radical selected from the group consisting of:

(A) $-CH_2-\overset{O}{\underset{\|}{C}}-OCH_2(CF_2)_nCF_2H$ (B) $-\overset{O}{\underset{\|}{C}}-OCH_2(CF_2)_nCF_2H$ (C) $-CH_2-\overset{O}{\underset{\|}{C}}-OCH_2C_nF_{2n+1}$ (D) $-\overset{O}{\underset{\|}{C}}-OCH_2C_nF_{2n+1}$ wherein R is a fluorinated carboxylate ester radical in at least one occurrence and in another differing occurrence is a radical selected from the group consisting of carboxyl and fluorinated carboxylate ester, and $n$ is an integer of from 3 to 22. Preferred lower alkyl radicals contain 1–4 carbon atoms.

Particularly useful materials have general formulae as follows:

(E) $CH_2=C-COOCH_2C_nF_{2n+1}$
     $\phantom{CH_2=}|$
     $CH_2-COOCH_2C_nF_{2n+1}$ (F) $CH_2=C-COOH$
     $\phantom{CH_2=}|$
     $CH_2-COOCH_2C_nF_{2n+1}$ (G) $CH_2-C-COOCH_2C_nF_{2n+1}$
     $\phantom{CH_2-}\|$
     $HC-COOCH_2C_nF_{2n+1}$ (H) $CH_2-C-COOH$
     $\phantom{CH_2-}\|$
     $HC-COOCH_2C_nF_{2n+1}$ where $n$ is an integer ranging from 3 to 8 and:

(I) $CH_2=C-COOH$
    $\phantom{CH_2=}|$
    $CH_2-COOCH_2(CF_2)_nCF_2H$ (J) $CH_2=C-COOCH_2(CF_2)_nCF_2H$
    $\phantom{CH_2=}|$
    $CH_2-COOCH_2(CF_2)_nCF_2H$ (K) $CH_3-C-COOH$
    $\phantom{CH_3-}\|$
    $HC-COOCH_2(CF_2)_nCF_2H$ (L) $CH_3-C-COOCH_2(CF_2)_nCF_2H$
    $\phantom{CH_3-}\|$
    $HC-COOCH_2(CF_2)_nCF_2H$ where $n$ is an integer ranging from 3 to 11.

Novel fluorocarbon esters may be conveniently synthesized employing a wide variety of known techniques. For example, such materials as itaconic and citraconic acids may be partially or completely esterified with various fluoroalcohols. Likewise, derivatives of the above acids such as the anhydride or acid chloride may be easily prepared and subsequently reacted with a fluoroalcohol.

The fluoroalcohol reactants are all either commercially available materials or can be themselves easily prepared. The alcohols, of course, fall within the general classes as follows:

$$HOCH_2(CF_2)_nCF_2H$$

$$HOCH_2C_nF_{2n+1}$$

where $n$ is an integer of from 3 to 22. Typically useful fluoroalcohols are described in U.S. Pat. 2,666,797. It is important that $n$ be at least 3 in the above alcohols in order that the synthesized polymerized ester thereof have sufficient hydrophobic character to impart an oleophobic character to fabrics treated therewith.

As alluded to above, the monomeric unsaturated esters may be easily polymerized to yield homopolymers or coreacted with a wide variety of differing monomeric substances to produce interpolymers as copolymers, terpolymers, etc. Novel copolymers or terpolymers may be simply made by interpolymerizing one or more of the present ester monomers with one or more polymerizable monomers of other types which contain ethylenic linkage. Examples of the latter materials include maleic anhydride, acrylonitrile, vinyl acetate, viny chloride, ethylene, vinyl silicones, styrene, divinyl benzene, methyl acrylate, methyl methacrylate, isoprene, butadiene, acrylamide, acrolein, diallyl amine, vinyl alcohol, etc. The just-related monomers readily polymerize with the unsaturated esters of the invention making possible the production of many types of polymers having differing physical properties. However, for best results in rendering fabrics oil and water resistant, it has been determined that at least 20% of the copolymers be composed of the subject ester materials. More preferred materials are copolymers which contain 25–95% of the above-described monomeric esters and 5–75% by weight of a differing comonomer. The most preferred comonomer is vinyl acetate which of course contributes the following mer unit to the interpolymer:

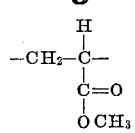

The ester monomers may be conveniently polymerized by such techniques as bulk, emulsion or solution polymerization. For example, the ester monomers may be homopolymerized or copolymerised in bulk at room temperature by employing light as an initiator. Likewise, homopolymers or copolymers may be easily made by polymerization at moderately elevated temperatures such as in the range of 50–100° C. Catalysts such as peroxides or other free radical general starters may be employed in the bulk polymerization.

Typical solution polymerization involves use of a fluorinated hydrocarbon medium. Fluorinated solvents such as benzotrifluoride are particularly good as solvating materials. Peroxide catalysts of the solid or liquid type such as benzoyl peroxide and cumene peroxide are suitable initiators in solution polymerization system. Likewise, redox catalyst systems such as potassium persulfate-sodium bisulfite combination may be used with equal facility.

Another type of suitable polymerization technique is one involving an emulsion of the homopolymer or ester interpolymer in aqueous media. Stable latices are produced which preferably contain 5–50% solids. The latices have a clear transparent appearance, and can be used as such without further modification to coat fabrics against oil and water adsorption. Likewise, the latices may be coagulated out of the emulsion such as by freezing or by diluting and adding an ionic coagulating agent such as salt. Again, a wide variety of emulsifiers may be employed such as the sodium alkyl sulfate type. Emulsion polymerization readily occurs at moderate temperatures such as in the range of 40–80° C.

The esters of the invention are generally high-boiling liquids which are highly reactive and polymerizable. They generally have low refractory indices and are colorless in character. The homopolymers and copolymers containing ester monomeric substituents are generally insoluble in common organic solvents. However, they are nevertheless soluble in certain other solvents and this is a valuable feature as it permits coating the polymers from solution. As solvents and plasticizers for these polymers, use can be made of the alkyl esters of fluorocarbon monocarboxylic acids, fluoroalcohols such as the 1,1-dihydroperfluoroalkyl alcohols and esters thereof such as the acetates and higher esters which contain fluorocarbon chains. The polymers are also readily soluble at room temperature in such fluorinated solvents as xylene hexafluoride, benzothifluoride, methyl perfluorobutyrate, trichlorfluoromethane and 1,1,2-trichloro-1,1,2-trifluoroethane.

The homopolymers and copolymers of the invention can be employed as coating reagents in conjunction with a wide variety of other adjuvants. For example, their properties can be varied by use of plasticizers such as high-boiling alkyl esters of fluorocarbon monocarboxylic acids. Likewise, they can be used in conjunction with a diverse number of additives such as pigments exemplified by carbon black and other finely-divided solid materials as zinc oxide and potassium carbonate. Again, the properties of the polymers can be somewhat varied by use of materials which, for example, increase the heat-resistance of the polymer mass. Incorporation therein of a small proportion of a poly-functional polymerizable compound at the time of polymerization can be easily effected to cause cross-linking between the skeletal chains and formation of a three-dimensional network. Extremely hard polymers can be produced by using sufficient cross-linking agents. Solid polymers can be recovered from the reaction mass by coagulating with alcohols such as methanol or by freezing, washing and drying.

The homopolymers or copolymers can be applied to the surface of the article to be treated from such volatile solutions by means of an aerosol "bomb" or "spray-can" applicator. It has been found that the coatings resultant from application of polymers are both water-repellant and oil-repellant due to dual capacity of being both hydrophobic and oleophobic. The ester homopolymers and copolymers are also characterized as being non-flammable in character. Thus, the polymers can be used as non-flammable coatings, and can be used in making gaskets which are highly-resistant to gasoline and oils, remain flexible at low temperatures and are highly resistant to ozone.

As briefly mentioned above, the polymerized ester monomers can be applied from solution or emulsion media to provide finely-bonded surface coatings or sizings on a wide number of articles. Particularly, it is preferred that the polymers be applied to textile fabrics (natural or synthetic), yarns, cloths, and other fabrics, paper, cellulosic film, leather, lithic materials, glass and ceramic articles and metals. A vast number of natural textile base materials may be treated such as cotton, canvas, wool, synthetic organic textile materials such as nylon, heat-resistant Orlon (polyacrylonitrile) and Saran (a vinylidene chloride-vinylchloride copolymer) and synthetic inorganic textile base materials such as fiberglass, asbestos, and the like. Due to properties of hydrophobicity and oleophobicity drops of water and oil deposited on the surface of the treated articles will remain in a non-adsorbed condition or run off rather than spreading or wetting the treated surface.

Such articles as textile fabrics can be conveniently treated in a manner so that the treated fabrics have an imperceptible sizing coating on the fibers which does not deleteriously affect the porosity, flexibility, feel and hand, strength, appearance or color. The coating or sizing is tightly bonded to the fibers which can be subjected to repeated launderings or dry-cleanings without losing its water-and-oil resistance. Heretofore, prior art coating materials were deficient in that they could be subjected to only a few repeated launderings or dry-cleanings before losing their oil and/or water resistant properties. Application of the ester polymers of the invention to textiles makes possible production of finished fabrics which are resistant to absorption and staining not only by water and aqueous materials, but also by oily and greasy materials. The oil or water substances are not adsorbed and can be wiped off or readily removed by suitable laundering or dry cleaning.

Thus, illustrative applications of the ester polymers of the invention include treatment of fabrics utilized in automobile upholstery, work clothes, sport clothes, coats and jackets and rugs and carpets which are particularly susceptible to soilings by oily and greasy materials so that resistance to such soiling combined with water repellancy is a highly-desirable situation. Likewise, raincoats and other apparel may be easily and simply treated to provide finally coated articles possessing excellent resistance to water and oil adsorption.

Example I

A reaction flask fitted with a stirrer and reflux condenser is charged with dioxane. 65.05 gr. (0.5 mole) of itaconic acid and 150 gr. (1 mole) of a commercially available perfluoroalcohol mixture are then dissolved in the dioxane. The perfluoroalcohols have the formula:

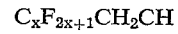

$$C_xF_{2x+1}CH_2CH$$

wherein X is an integer from 1–3. All three alcohols are present in the mixture in approximately equal molar proportions. 2 to 3 grams of concentrated sulphuric acid are added to catalyze the esterification, and the vessel is closed. The stirrer is started and the mixture is refluxed for 4–6 hours. At the end of this period, the dioxane is distilled off, leaving a colorless liquid, diester, behind. The residue is then washed with water to remove the sulphuric acid.

The diester is then extracted with ether and dried over $Na_2SO_4$.

Example II 50 grams of the difluoro ester prepared in accordance with Example I are placed in a reaction vessel. The difluoro ester product is heated to 180–200° C. under a vacuum (1–2 milliliter of Hg) for a 2.5-hour period. The liquid difluoro ester product slowly polymerizes to a rubbery mass.

Example III 197.05 gms. of the difluoro ester prepared in accordance with Example I is placed in a reaction vessel equipped with a stirrer, thermometer, nitrogen inlet and outlet tubes, and two separatory funnels. 200 ml. of water containing 4 gms. of trimethyltetradecylammonium chloride emulsifying agent are added and the mixture is agitated to form an emulsion. The reaction vessel is closed and the liquid and space above it are purged of air with a flow of nitrogen. One gram of benzoyl peroxide catalyst is dissolved in 5 milliliters of diethyl ether and placed in one of the separatory funnels. 36.23 grams of a commercially available acrylic acid are placed into the other separatory funnel. The catalyst is fed into the reaction vessel, the stirrer is started, and nitrogen is passed through the mixture at a slow rate. The mixture is heated to 70° C., and the acrylic acid in the separatory funnel is added at a slow rate over a period of 1 hour during which time the temperature is maintained at 60–80° C., and the stirring is continued. Stirring and the heating are continued for another hour, and the reaction vessel is then opened. The product is a white, milky copolymer latex.

In order to test oil repellancy imparted to a treated fabric by the polymers of the invention, the following test procedure was devised: 2" x 6" swatches of fabric were placed on the table. The fabrics had been previously coated with the just-mentioned compounds. Various mixtures of mineral oil (Nujol) and heptane were prepared as stock solutions. A drop of each of these mixtures of the above hydrocarbons was then placed on the treated fabric surface. After one minute's time, the fabrics were inspected to determine the particular mixture of mineral oil-heptane which did not wet the fabric under the conditions of the test. According to the highest amount of heptane in the mixture which did not affect the fabric, the test fabric is assigned a rating. For example, a mixture of 70% by volume of mineral oil and 30% by volume of heptane which was repelled by the fabric was considered to have a rating of 80. Acceptable ratings should be at least 50 or more, and it is more desired that the treated fabric have a rating of about 70 in this test.

In the test run, the following mixures of heptane and Nujol were prepared as test solutions and each applied as test drops to the coated fabric.

TABLE I

| | Percent by volume of— | |
|---|---|---|
| | Heptane | Nujol mineral oil |
| Oil repellancy rating: | | |
| 100 | 50 | 50 |
| 90 | 40 | 60 |
| 80 | 30 | 70 |
| 70 | 20 | 80 |
| 60 | 10 | 90 |
| 50 | 0 | 100 |

In each instance, the polymer compounds of Examples II and III when applied to test fabrics yielded a finally coated article having a rating of approximately 100. Such excellent oil resistant results have heretofore not been obtainable by use of other known polymeric coating substances. Likewise, in no instance did the sized fabrics adsorb added drops of water.

CONCLUSION

While the specific examples of the foregoing specification described certain textile-treating agents as well as their preferred conditions for use, it will be clear to the expert that the results of my invention may be achieved by suitable substitutions and alterations within the skill of technologists having ordinary experience. Still other changes and modifications within the scope of my invention will also readily occur to the expert and are deemed to be encompassed within the scope of my invention which I now proceed to define by the appended claims.

I claim:
1. Articles coated with homopolymers of fluorinated esters selected from the group consisting of:

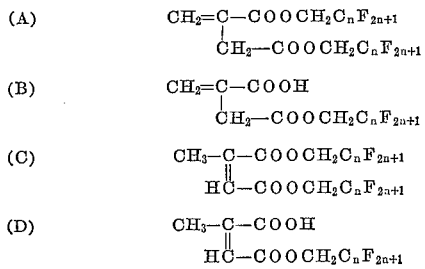

where $n$ is an integer of from 3 to 8 in an amount to render the article water and oil repellent.

2. Articles coated with homopolymers of fluorinated esters selected from the group consisting of:

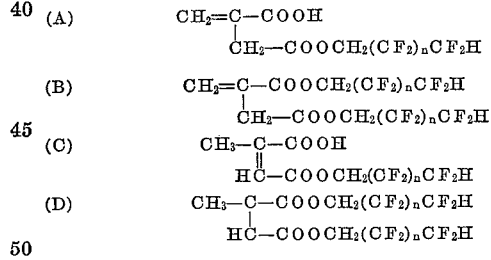

where $n$ is an integer of from 3 to 11 in an amount to render the article water and oil repellent.

References Cited

UNITED STATES PATENTS

| 2,642,416 | 6/1953 | Ahlbrecht et al. | 260—83.5 |
| 2,803,615 | 8/1957 | Ahlbrecht et al. | 260—29.6 |
| 2,841,573 | 7/1958 | Ahlbrecht et al. | 117—143X |
| 3,128,303 | 4/1964 | Zimmerman | 260—485 |
| 3,223,725 | 12/1965 | Hill | 260—485 |
| 3,239,557 | 3/1966 | Fasick | 260—485 |
| 3,282,905 | 11/1966 | Fasick et al. | 117—121X |
| 3,385,882 | 5/1968 | Tullio | 260—485 |

WILLIAM D. MARTIN, Primary Examiner

T. G. DAVIS, Assistant Examiner

U.S. Cl. X.R.

117—138.8, 141, 142, 143, 161